United States Patent
Kobayashi

(10) Patent No.: US 10,310,823 B2
(45) Date of Patent: Jun. 4, 2019

(54) PROGRAM DEVELOPMENT SUPPORT SYSTEM AND PROGRAM DEVELOPMENT SUPPORT SOFTWARE

(71) Applicant: Renesas Electronics Corporation, Koutou-ku, Tokyo (JP)

(72) Inventor: Yuki Kobayashi, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 369 days.

(21) Appl. No.: 15/249,336

(22) Filed: Aug. 26, 2016

(65) Prior Publication Data

US 2017/0090882 A1    Mar. 30, 2017

(30) Foreign Application Priority Data

Sep. 24, 2015 (JP) .................................. 2015-186569

(51) Int. Cl.
| | | |
|---|---|---|
| *G06F 9/44* | (2018.01) | |
| *G06F 8/35* | (2018.01) | |
| *G06F 8/20* | (2018.01) | |
| *G06F 9/54* | (2006.01) | |

(52) U.S. Cl.
CPC .................. *G06F 8/35* (2013.01); *G06F 8/20* (2013.01); *G06F 9/541* (2013.01)

(58) Field of Classification Search
None
See application file for complete search history.

(56) References Cited

U.S. PATENT DOCUMENTS

| | | | | |
|---|---|---|---|---|
| 5,317,734 A | * | 5/1994 | Gupta ...................... | G06F 8/45 717/150 |
| 7,478,375 B1 | * | 1/2009 | Kersters .................. | G06F 8/316 717/144 |
| 2002/0157086 A1 | * | 10/2002 | Lewis ..................... | G06F 8/314 717/127 |
| 2011/0107162 A1 | | 5/2011 | Martinez Canedo et al. | |

FOREIGN PATENT DOCUMENTS

| | | |
|---|---|---|
| JP | 2004-265393 A | 9/2004 |
| JP | 2011-096107 A | 5/2011 |

* cited by examiner

*Primary Examiner* — Qamrun Nahar
(74) *Attorney, Agent, or Firm* — Shapiro, Gabor and Rosenberger, PLLC

(57) ABSTRACT

The program development support system which creates a program described in a graph form, and arranged for executing data processing by a target device includes: a GUI part; a program-creating part; a process-executing function database; and a data-transfer function database. On condition that a process included in the data processing can be executed by different kinds of processing units provided in a target device, process-executing functions for executing the process by the respective processing units are held in the process-executing function database, and data-transfer functions therefor are held in the data-transfer function database. Which processing unit to use for executing the process can be selected by the GUI part. The program-creating part reads a process-executing function corresponding to the processing unit thus selected, and data-transfer functions and creates a program for making a target device execute the intended data processing. The program development support system increases the design productivity.

20 Claims, 12 Drawing Sheets

Fig.1

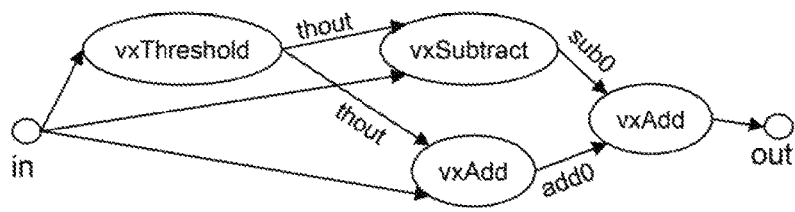

Fig.2

```
void func(){
 vx_context context = vxCreateContext();
 vx_image in  = vxCreateImage(context, width, height, VX_DF_IMAGE_U8);
 vx_image out = vxCreateImage(context, width, height, VX_DF_IMAGE_U8);
 vx_graph graph = vxCreateGraph(context);
 thout = vxCreateVirtualImage( graph, Width, Lines, VX_DF_IMAGE_U8 );
 sub0 = vxCreateVirtualImage( graph, Width, Lines, VX_DF_IMAGE_U8 );
 add0 = vxCreateVirtualImage( graph, Width, Lines, VX_DF_IMAGE_U8 );
 ...(OMISSION)...
 vxThresholdNode(graph, in, thres, thout);       ⎫
 vxSubtractNode(graph, thout, in, sub0);         ⎬ DEFINITION OF GRAPH
 vxAddNode(graph, thout, in, add0);              ⎪ STRUCTURE
 vxAddNode(graph, sub0, add0, out);              ⎭
 ...(OMISSION)...
 vxVerifyGraph(graph);      ⎫ ANALYSIS OF GRAPH STRUCTURE, AND
 vxProcessGraph(graph);     ⎬ EXECUTION OF PROCESSES FOR
 ...(OMISSION)...           ⎭ GRAPH REPRESENTATION
 vxReleaseGraph(&graph);
 vxReleaseContext(&context);
}
```

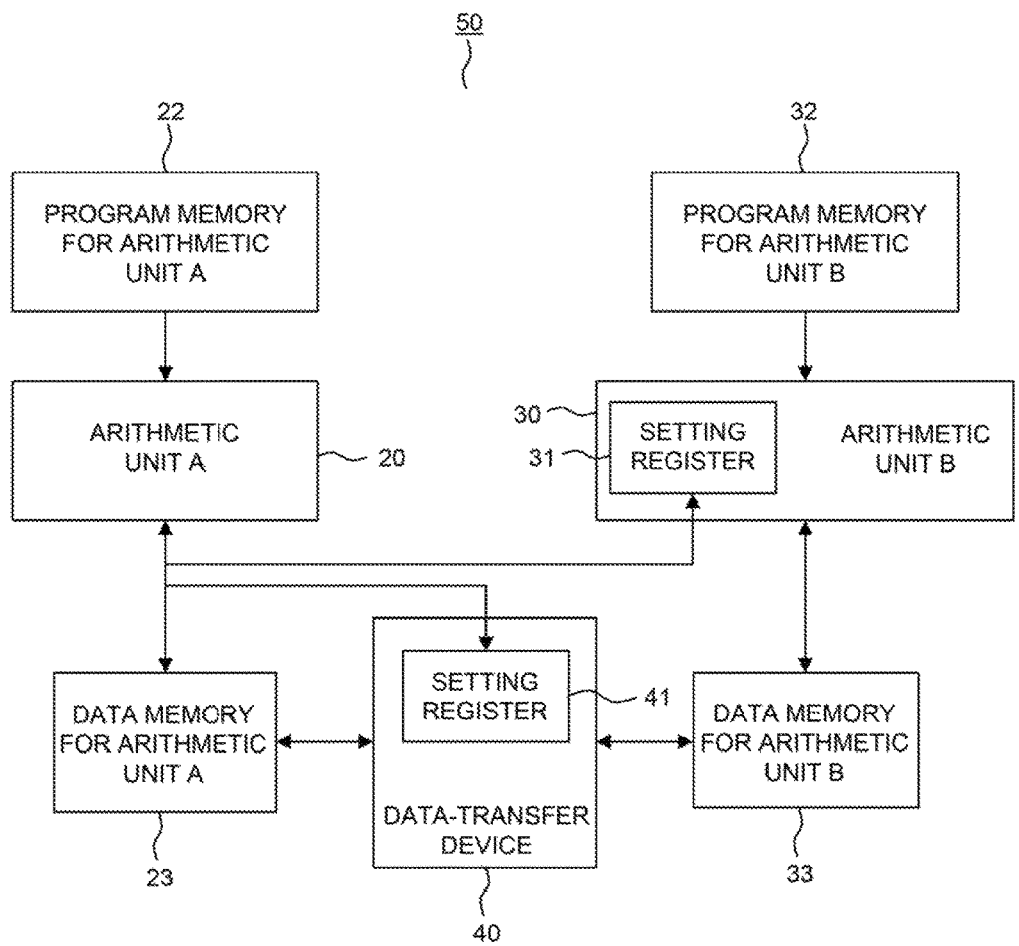

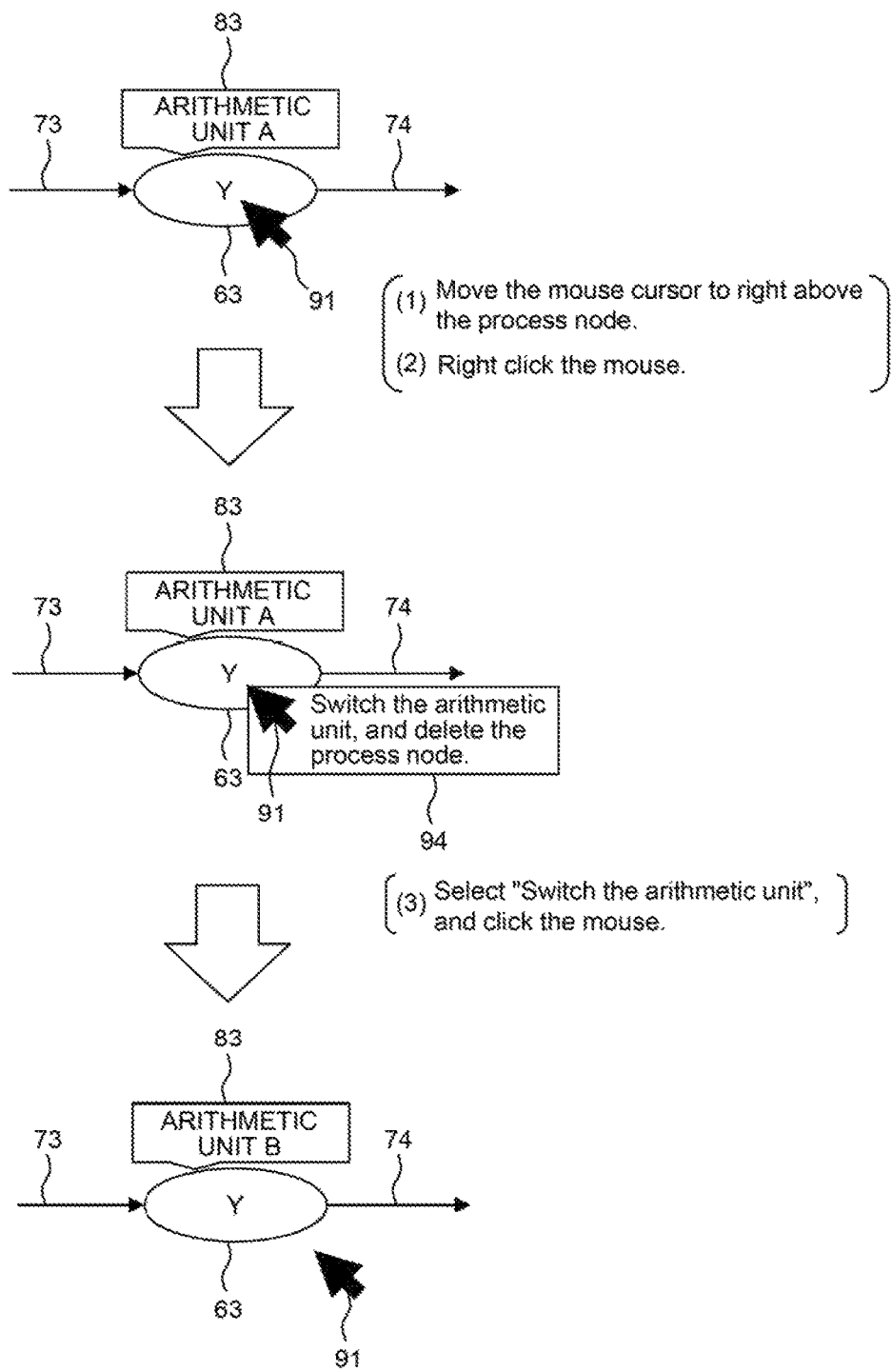

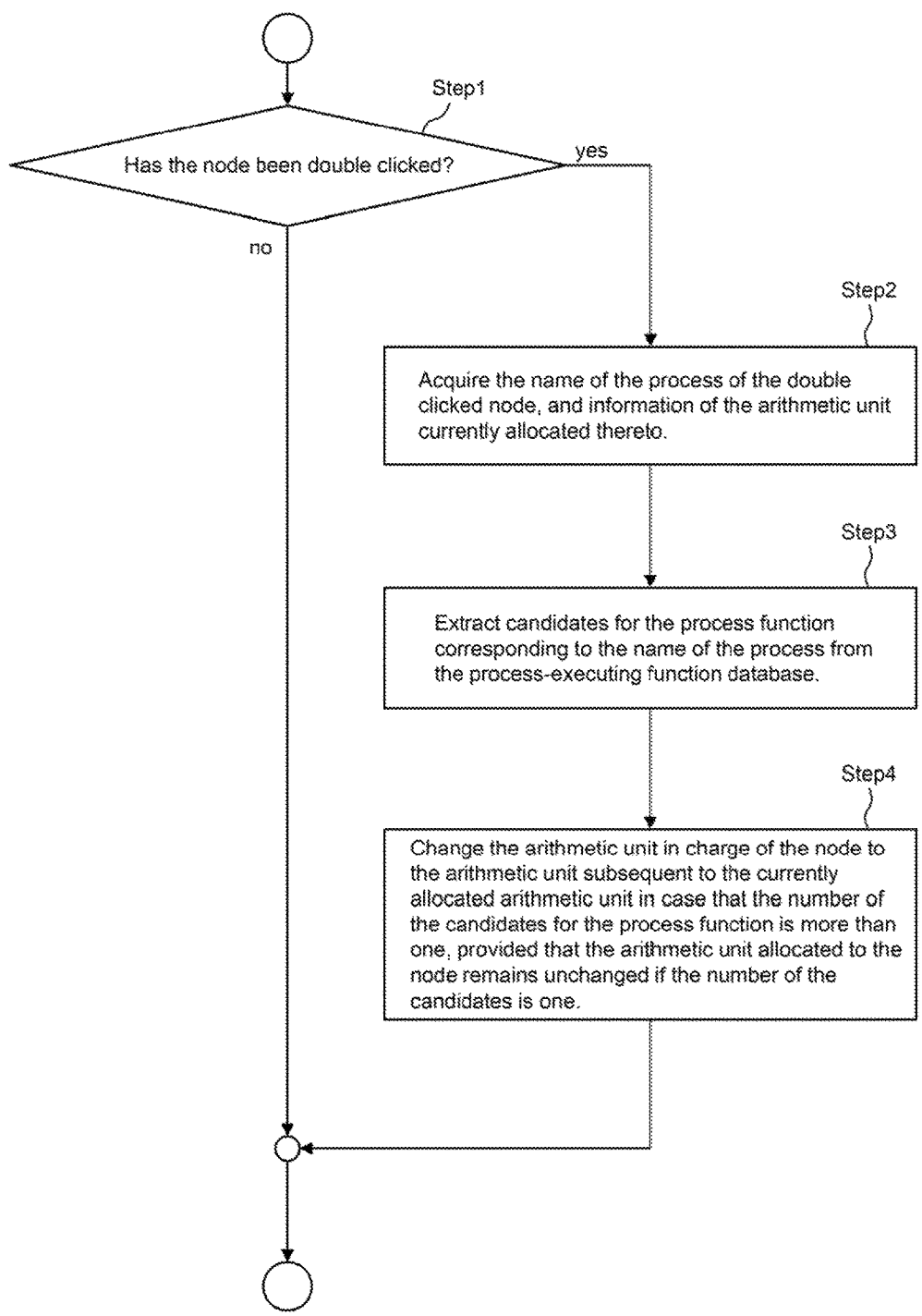

Fig.12

| PROCESS NAME | ARITHMETIC UNIT A | ARITHMETIC UNIT B |
|---|---|---|
| PROCESS W | funcW(in1,out1) | - |
| PROCESS X | funcX(in1,out1) | start_B_funcX(in1,out1) |
| PROCESS Y | funcY(in1,out1) | start_B_funcY(in1,out1) |
| PROCESS Z | funcZ(in1,out1) | - |

Fig.13

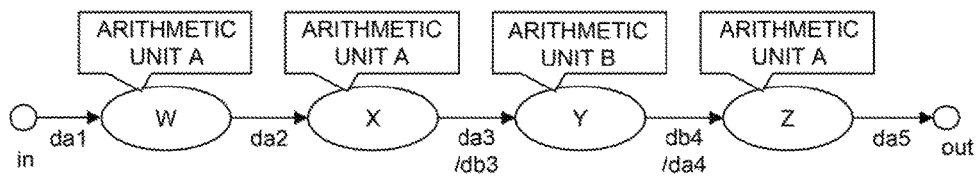

Fig.14

```
1    da1 = alloc_A(IMG_SIZE);
2    da2 = alloc_A(IMG_SIZE);
3    da3 = alloc_A(IMG_SIZE);
4    db3 = alloc_B(IMG_SIZE);
5    db4 = alloc_B(IMG_SIZE);
6    da4 = alloc_A(IMG_SIZE);
7    da5 = alloc_A(IMG_SIZE);
8
9    load_input(da1);
10
11   funcW(da1,da2);
12
13   funcX(da2,da3);
14
15   copy_to_B(da3,db3, IMG_SIZE);    // COPY TO B.
16   start_B_funcY(db3,db4);          // EXECUTE BY B.
17   copy_from_B(db4,da4, IMG_SIZE);  // COPY FROM B.
18
19   funcZ(da4,da5);
20
21   save_output(da5);
22
```

Fig.16

| INPUT-SIDE ARITHMETIC UNIT | OUTPUT-SIDE ARITHMETIC UNIT | DATA-TRANSFER FUNCTION |
|---|---|---|
| ARITHMETIC UNIT A | ARITHMETIC UNIT B | copy_to_B(src,dst,size) |
| ARITHMETIC UNIT B | ARITHMETIC UNIT A | copy_from_B(src,dst,size) |

Fig.17

```
1   int alloc_B(int size){
2     *addr_b_arg1 = size;
3     *addr_b_func = FUNC_B_ALLOC;
4     *addr_b_start = 1; // Activate the arithmetic unit B with a set parameter.
5     while (*addr_b_finish != 0) { /*Wait for the completion of the process.*/ }
6     return *addr_b_return;
7   }
8
9   void start_B_funcY(int in1, int out1){
10    *addr_b_arg1 = in1;
11    *addr_b_arg2 = out1;
12    *addr_b_func = FUNC_B_Y; // Function which accepts arg1 as an input,
      and writes the result in arg2
13    *addr_b_start = 1; // Activate the arithmetic unit B with set parameters.
14    while (*addr_b_finish != 0) { /*Wait until the completion of process.*/ }
15  }
16
17  void copy_to_B(int addr_a, int addr_b, int size){
18    *addr_dma_a = addr_a;
19    *addr_dma_b = addr_b;
20    *addr_dma_direction = FROM_A_TO_B;
21    *addr_dma_start = 1;
22    while (*addr_dma_finish != 0) { /*Wait until the completion of transfer.*/ }
23  }
24  void copy_from_B(int addr_b, int addr_a, int size){
25    *addr_dma_a = addr_a;
26    *addr_dma_b = addr_b;
27    *addr_dma_direction = FROM_B_TO_A;
28    *addr_dma_start = 1;
29    while (*addr_dma_finish != 0) { /*Wait until the completion of transfer.*/ }
30  }
```

Fig.18

```
1    da1 = alloc_A(IMG_SIZE);
2    da2 = alloc_A(IMG_SIZE);
3    da3 = alloc_A(IMG_SIZE);
4    da3B = alloc_A(IMG_SIZE);
5    db3 = alloc_B(IMG_SIZE);
6    da4 = alloc_A(IMG_SIZE);
7    da4B = alloc_A(IMG_SIZE);
8    db4 = alloc_B(IMG_SIZE);
9    da5 = alloc_A(IMG_SIZE);
10
11   load_input(da1);
12
13   funcW(da1,da2);
14
15   funcX(da2,da3);
16
17   LittleEndianToBigEndian(da3, da3B, 4); // Convert to Big Endian.
18   copy_to_B(da3B,db3, IMG_SIZE);        // Copy to B
19   start_B_funcY(db3,db4);               // Execute by B
20   copy_from_B(db4,da4B, IMG_SIZE);      // Copy from B
21   BigEndianToLittleEndian(da4B, da4, 4); // Convert to Little Endian
22
23   funcZ(da4,da5);
24
25   save_output(da5);
26
```

PROGRAM DEVELOPMENT SUPPORT SYSTEM AND PROGRAM DEVELOPMENT SUPPORT SOFTWARE

CROSS-REFERENCE TO RELATED APPLICATIONS

The Present application claims priority from Japanese application JP 2015-186569 filed on Sep. 24, 2015, the content of which is hereby incorporated by reference into this application.

BACKGROUND

The present invention relates to a program development support system and program development support software, and especially to those which can be preferably utilized for a graph GUI programming environment for development of a program caused to run by a processing unit on a target device from a user application described in a graph form.

OpenVX is API (Application Programming Interface) designed for image recognition, and established by "The Khronos Group" (hereinafter referred to as "Khronos"), in which a graph manager interprets a user application described in a graph form and uses a processing unit on a target device to efficiently perform a process.

FIG. 1 shows, by example, a user application described in a graph form for OpenVX, and FIG. 2 shows examples of OpenVX codes corresponding thereto. In OpenVX codes, a group of functions each stated in the form of vx**Node( ) is used to define a graph structure. Then, the graph structure is analyzed by the function vxVerifyGraph( ), and the parallelism of processes represented in a graph and the order of the processes are determined. The processes are executed by the function vxProcessGraph( ). In this example, as shown in FIG. 1, an input image in is subjected to a binarization process at vxThreshold node, and subtraction and addition are performed at vxSubtract and vxAdd nodes respectively, the results of which are finally added up to produce an output image out. In the example, vxThreshold must be executed first, whereas of vxSubtract and the first vxAdd, either may be performed prior to the other, or they may be processed in parallel. Incidentally, the graph herein described refers to a directed acyclic graph.

In regard to a node (Base Node) used in the graph, specifications of a required accuracy, behavior, etc. are defined by Khronos strictly to keep the compatibility. For instance, vxPhase node for calculating an edge direction for each pixel is defined so as to output with an accuracy of 8 bits of 0-255.

In addition to OpenVX, other program development environments arranged so that a directed acyclic graph is used as input means are proposed.

The Japanese Unexamined Patent Application Publication No. JP-A-2004-265393 discloses a control program construction system to construct a desired control program while using a graph on a display serving as a GUI (Graphical User Interface); the graph is arranged by connecting between nodes representing operation faculties through connection lines. Adopting directed acyclic graphs as common means for modeling in various systems, the system integration can be made easier.

JP-A-2011-096107 discloses a technique for speeding up the execution of a program by parallel processing in a simulation system caused to run on a multiprocessor system.

Target devices which OpenVX supports include a system LSI (Large Scale Integrated circuit) such as SoC (System-on-a-Chip). System LSIs such as SoCs, which are used as such a target device, include one having an image-processing processor enhanced in operation faculty peculiar to image processing or an accelerator which enables the speedup of a particular operation in addition to CPU (Central Processing Unit). For instance, R-Car V2H of Renesas Electronics Corporation has 2D and 3D graphics engines in addition to CPU, and it further includes an accelerator termed "Image Recognition Engine".

SUMMARY

After examination on JP-A-2004-265393 and JP-A-2011-096107, the inventor found that there is an additional problem as described below.

In a graph GUI programming environment to develop a program, which is caused to run by a processing unit on a target device, from a user application described in a graph form like OpenVX, a developer is allowed to implement a process for a node on different kinds of processing units. In this case, the different kinds of processing units obtain processing results identical to each other, but they must be different in the processing time until the results are obtained and the power consumption. For instance, as to a target device having a processing unit (accelerator) in addition to CPU, the processing time for a process and the power consumption are considered to vary between CPU and the accelerator consequently. This is because CPU and the accelerator are largely different from each other in internal structure. Incidentally, "the different kinds of processing units" herein refer to processing units different from each other in circuit structure for executing an operation. For instance, the different kinds of processing units are not limited to ones largely differing from each other like CPU and an accelerator; they may be identical CPUs, one of which uses a multiplier circuit to execute an instruction for performing a multiplication and another uses an adder circuit instead of the multiplier circuit to execute the same multiplication according to a repetition function.

The presence of candidate processing units capable of executing the same process has the advantage that the degree of design freedom for a user can be increased. On the flip side, in order to select an optimum processing unit for each process, it is necessary to make evaluation on a processing time and a power consumption while variously changing the assignment to the processing units. On this account, in case that the number of kinds of processing units, or the number of processes that a user application includes is large, namely in the case of a complicated graph, the evaluation of and search for a large number of combinations are required and thus, further increase in design productivity is required.

A graph GUI programming environment is an environment suitable for increasing the productivity of a user application. A method for preparing a user application simply and conveniently in the manner of connecting parts, and a method targeted for a system such as a multiprocessor having processing units of the same kind have been proposed until now, which includes e.g. a method for constructing a user application by a mouse handling. JP-A-2004-265393 discloses a method for preparing a program with GUI. JP-A-2011-096107 discloses a method for optimizing a graph over loops.

However, methods for optimizing nodes executed in parallel on a graph, and the allocation to processing units of the same kind are just known in the prior art. It is found that because of no method for specifying the allocation to processing units different in kind, there has been the problem of the impossibility of efficiently evaluating and searching for a large number of combinations in the case of a complicated graph, such as the case of many kinds of processing units involved, or the case of a user application including many processes.

While the means for solving the problem will be described below, other problems and novel features hereof will become apparent from the description hereof and the accompanying drawings.

One embodiment of the invention is as follows.

A program development support system which creates a program for executing, by a target device, data processing described in a graph form based on graph information includes: a graphical user interface (GUI) part; a program-creating part; a process-executing function database; and a data-transfer function database. The GUI part displays a graph based on the graph information, in which processes included in the data processing make nodes respectively and flows of data form directed connection lines. On condition that a process included in the data processing can be executed by different kinds of processing units provided in a target device, process-executing functions for executing the process by the processing units respectively are held in the process-executing function database, and data-transfer functions for executing the process by the respective processing units are held in the data-transfer function database. The GUI part displays the fact that the processes can be executed by the processing units, and allows a user to select which processing unit to use for process execution. The program-creating part reads an appropriate process-executing function corresponding to the processing unit thus selected, and data-transfer functions from the process-executing function database and the data-transfer function database, to create a program for executing, by a target device, the intended data processing.

The effects achieved by the above embodiment will be briefly described below.

In case that a process included in intended data processing can be executed by different kinds of processing units, the processing unit made to execute the process can be specified readily. Since a program to be executed by the processing unit thus specified is created, the evaluation of and search for a large number of combinations can be performed readily and therefore, the design productivity can be increased.

BRIEF DESCRIPTION OF THE DRAWINGS

FIG. 1 is an explanatory diagram showing the description of a graph form of a user application according to OpenVX;

FIG. 2 is an explanatory diagram showing, by example, OpenVX codes corresponding to the graph form description of FIG. 1;

FIG. 4 is a block diagram showing an example of the configuration of hardware which the program development support system according to the first embodiment is implemented on;

FIG. 5 is a block diagram showing an example of the configuration of a target device;

FIG. 6 is an explanatory diagram showing an example of a setting register 31 which a processing unit B(30) includes;

FIG. 10 is an explanatory diagram showing a method arranged to use a context menu, which is an example of the operation for switching the processing unit in charge of process execution;

FIG. 11 is a flow chart for the method arranged to use a double click;

FIG. 12 is an explanatory diagram showing examples of process-executing functions stored in a process-executing function database 5;

FIG. 13 is an explanatory diagram showing an example of a user application described in a graph form;

FIG. 14 is an explanatory diagram showing an example of a program created from the user application of FIG. 13;

FIG. 16 is an explanatory diagram showing a data-transfer function used in the program of FIG. 14;

FIG. 17 is an explanatory diagram showing various functions used in the program of FIG. 14;

FIG. 18 is an explanatory diagram showing an example of a program arranged to use a data-transfer function to which the faculty of data conversion is added.

DETAILED DESCRIPTION

Figure 3:
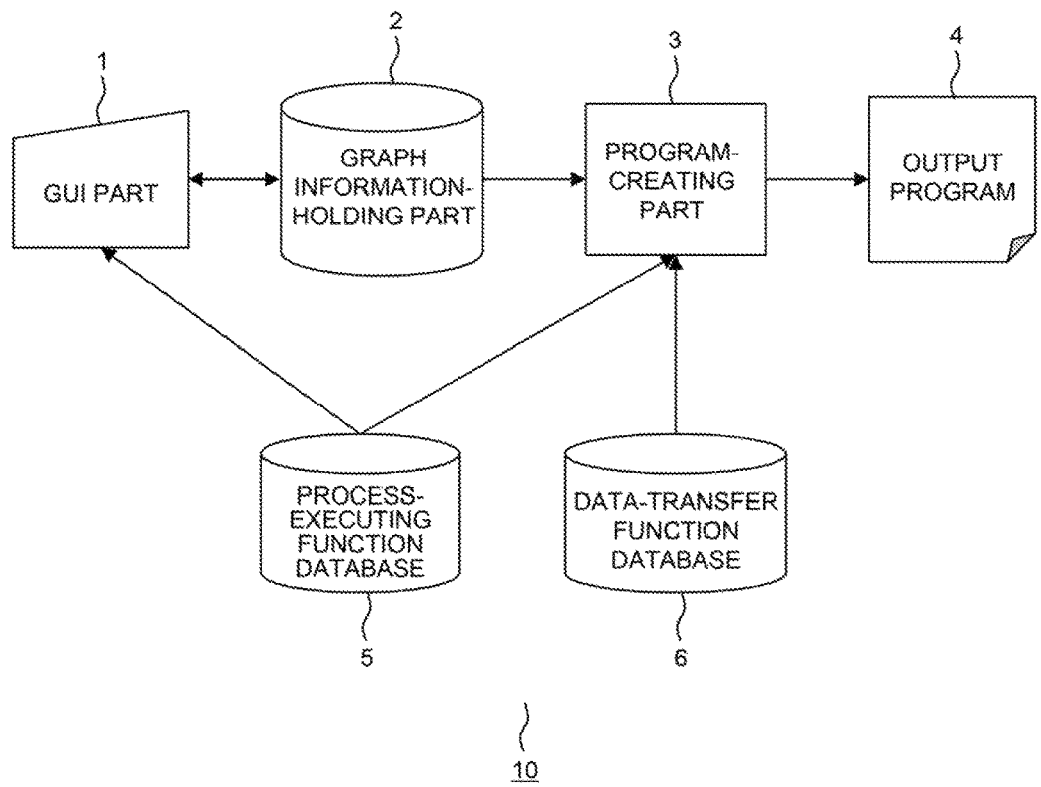
FIG. 3 is a block diagram showing a configuration of a program development support system according to the first embodiment.

The embodiments will be described in detail. In all the drawings for describing embodiments for carrying out the invention, elements having like faculties are identified by the same reference numeral, and their repeated explanation is omitted.

[First Embodiment]

Figure 4:
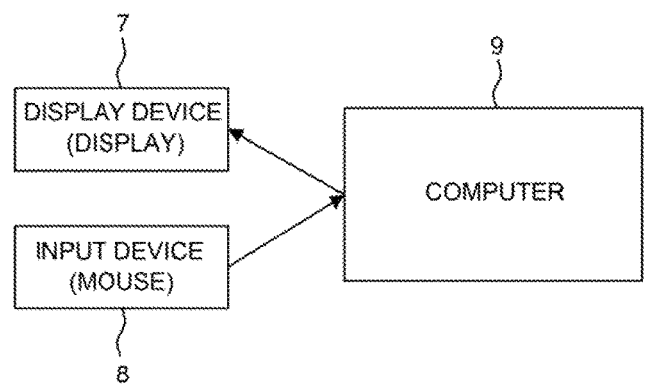

FIG. 3 is a block diagram showing a configuration of a program development support system 10 according to the first embodiment. FIG. 4 is a block diagram showing an example of the configuration of hardware which the program development support system 10 is implemented on. FIG. 5 is a block diagram showing an example of the configuration of a target device 50.

The program development support system 10 is materialized as software (program development support software) working on a computer 9 including a display device 7 and an input device 8, e.g. a mouse. The program development support software is supplied to a computer 9 through one of various forms of computer-readable media. The computer-readable media include intangible media, such as electric signals, light signals and electromagnetic waves, which are to be supplied to the computer 9 via communication means such as a network in addition to tangible media, e.g. a magnetic recording medium, a magneto-optical recording medium, an optical recording medium and a semiconductor storage medium. Examples of the tangible media include a magnetic tape, a magnetic disk, a magneto-optical disk, a Blue-ray Disk®, DVD (Digital Versatile Disc)®, various compact disks (e.g. CD, CD-ROM, CD-R and CD-RW), and USB memory. Communication means making the intangible media include Ethernet®, optical fiber, and wireless LAN (Local Area Network).

The program development support system 10 includes: a graphical user interface (GUI) part 1; a graph information-holding part 2; a program-creating part 3; a process-executing function database 5; and a data-transfer function database 6. The program development support system creates a program 4 for making the target device 50 execute data processing described in a graph form based on graph information. The target device 50 therein has processing units (20, 30, . . . ). The graph information makes a graph in which each process included in the data processing, which is a user application, forms a node and each flow of data makes a directed connection line.

The GUI part 1 displays such graph information on the display device 7, thereby offering an environment which allows a user to input and edit the data processing of an application software program which he or she desires to create. The graph information-holding part 2 holds input graph information; when holding it, the data format is an appropriate one.

The process-executing function database 5 is a database holding process-executing functions for executing the processes with processing units capable of executing processes included in data processing, provided that the processing units make part of the processing units (20, 30, . . . ) provided in the target device 50. In case that one process can be executed by any one of more than one kind of processing units, a process-executing function is prepared and held for each processing unit capable of executing it; the process-executing function database 5 holds process-executing functions for executing individual processes included in the data processing by the processing units provided in the target device.

The data-transfer function database 6 is a database holding data-transfer functions for executing process-executing functions held by the process-executing function database 5 with the corresponding processing units. The data-transfer functions may include the faculty of data form conversion and the faculty of data array conversion on a memory in addition to the capability of simple data transfer.

The program-creating part 3 reads an appropriate process-executing function from the process-executing function database 5 based on graph information held by the graph information-holding part 2, and an appropriate data-transfer function from the data-transfer function database 6, and creates and outputs a program 4.

Of the processing units provided in the target device 50, any one of the processing unit A(20) and the processing unit B(30) different in kind from each other can execute one of the processes involved in the data processing of a user application.

In the target device 50 shown in FIG. 5, only the two processing units A(20) and B(30) capable of executing the process concerned are illustrated; a program memory 22 and a data memory 23 are connected to the processing unit A(20); and a program memory 32 and a data memory 33 are connected to the processing unit B(30). The target device 50 further includes a data-transfer device 40 which transfers data between the data memory 23 of the processing unit A(20) and the data memory 33 of the processing unit B(30).

Although no special restriction is intended, the processing unit A(20) is e.g. CPU; the processing unit B(30) is an accelerator; and the data-transfer device 40 is DMAC (Direct Memory Access Controller). In addition, the setting register 31 of the processing unit B(30), and the setting register 41 of the data-transfer device 40 can be set by the processing unit A(20), which is CPU.

The processing unit B(30) has the setting register 31 which enables the change in the kind of an operational process to be executed. Further, process parameters, such as an argument of a function and a return value thereof, and control commands for start, etc. can be set on the setting register; and a status showing the end of operation or the like can be read therefrom. FIG. 6 shows an example of the setting register 31 which the processing unit B(30) includes. The setting register 31 includes words b_start, b_finish, b_func, b_return and b_arg1 to b_arg5. The word b_start is one for writing a start command for causing the processing unit B(30) to start a process. The word b_finish is one for showing a status where the processing unit B(30) is in the middle of process execution or has completed it. The word b_func is one for specifying the content (kind) of a process which the processing unit B(30) executes. The word b_return is one for storing a return value of a function executed by the processing unit B(30). The words b_arg1 to b_arg5 are ones for writing various arguments of a function executed by the processing unit B(30).

Figure 7:
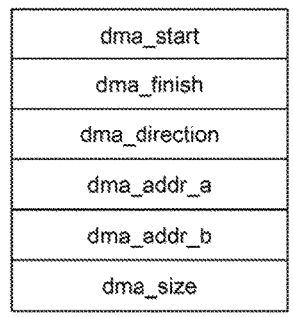
FIG. 7 is an explanatory diagram showing an example of a setting register 41 which a data-transfer device 40 includes.

The data-transfer device 40 has the setting register 41 on which parameters, such as the address of a transfer source and the address of a transfer destination, and a quantity of transferred data are set. Further, control commands for start of transfer, etc. can be set on the setting register. The data-transfer device may include a status register for displaying a status of data transfer. FIG. 7 shows an example of the setting register 41 which the data-transfer device 40 includes. The example is based on the premise that the data-transfer device 40 is DMAC, in which the setting register includes words dma_start, dma_finish, dma_direction, dma_addr_a, dma_addr_b and dma_size. The word dma_start is one for writing a transfer start command for causing the data-transfer device 40 to start DMA transfer. The word dma_finish is one for showing a status where the data-transfer device 40 is in the middle of DMA transfer execution or has completed it. The word dma_direction is one for setting the direction of DMA transfer. That is, the word dma_direction is arranged for setting data transfer from the data memory 23 of the processing unit A(20) to the data memory 33 of the processing unit B(30) or reversely, from the data memory 33 of the processing unit B(30) to the data memory 23 of the processing unit A(20). The dma_addr_a is one for setting the head address of the data memory 23 of the processing unit A(20). The word dma_addr_b is one for setting the head address of the data memory 33 of the processing unit B(30). In the case of transfer from the processing unit A(20) to the processing unit B(30), the word dma_addr_a is made a source address, and the word dma_addr_b is made a destination address. Reversely, in the case of transfer from the processing unit B(30) to the processing unit A(20), the word dma_addr_b is made a source address, and the word dma_addr_a is made a destination address. The word dma_size is one for setting the size of data targeted for the data transfer.

The arrangement like this is just an example. The processing unit A(20) and the processing unit B(30) may be CPUs different from each other in architecture. The combinations of the program memories 22 and 32 and the data memories 23 and 33 may be each arranged in the form of one memory serving to store a program and data together physically, or they may be arranged in the form of one memory common to the two processing units. Alternatively, the respective memories may be arranged to include cache memories and stratified. FIG. 5 just shows one extremely simple example of the target device 50.

On condition that a process can be executed any of more than one kind of the processing units, a process-executing function is prepared for each processing unit capable of executing the process and held by the process-executing function database 5. Further, on condition that a process can be executed by the processing unit A(20) and the processing unit B(30), the process-executing function database 5 holds a first process-executing function for executing the process by the processing unit A(20), and a second process-executing function for executing the process by the processing unit B(30). In this time, the data-transfer function database 6 holds a first data-transfer function for executing the first process-executing function with the processing unit A(20), and a second data-transfer function for executing the second process-executing function with the processing unit B(30). Further, on condition that the process can be executed only by the processing unit A(20), the first process-executing function for executing the process with the processing unit A(20) is held. For each of processes which the data processing of the user application includes, the process-executing function for executing the process with at least one of the processing units is prepared and held, depending on which of the two processing units is capable of executing the process.

The data-transfer function database 6 is a database holding data-transfer functions for executing process-executing functions held by the process-executing function database 5 with the corresponding processing units. On condition that the processing unit A(20) is CPU, and the processing unit B(30) is an accelerator, data-transfer functions for making the processing unit B(30) which is an accelerator execute a part of the data processing are stored in the data-transfer function database 6. Specifically, a data-transfer function for performing data transfer from the data memory 23 of the processing unit A(20) to the data memory 33 of the processing unit B(30), and a data-transfer function for transferring a result of an operation by the processing unit B(30) from the data memory 33 to the data memory 23 of the processing unit A(20) are stored in the data-transfer function database 6. In this time, the data-transfer function may include the faculty of data form conversion and the faculty of data array conversion on a memory in addition to the faculty of simple data transfer.

In case that the data processing includes a process as described above, the GUI part 1 have the processing unit, which is capable of executing the process, displayed at a node corresponding to the process in graph information displayed on the display device 7. In the above embodiment, the display device 7 is caused to display the fact that the processing unit A(20) or the processing unit B(30) can execute the process; and which processing unit to be made to execute the process can be selected by the input device 8.

The program-creating part 3 selectively reads an appropriate process-executing function from the process-executing function database 5 according to the processing unit selected through the input device 8, selectively reads an appropriate data-transfer function from the data-transfer function database, and creates a program 4.

Thus, in case that a process included in intended data processing can be executed by different kinds of processing units, the processing unit made to execute the process can be specified readily. Since a program to be executed by the processing unit thus specified is created, the evaluation of and search for a large number of combinations can be performed readily and therefore, the design productivity can be increased.

Now, the action of the program development support system 10 will be described further in detail.

Figure 8:
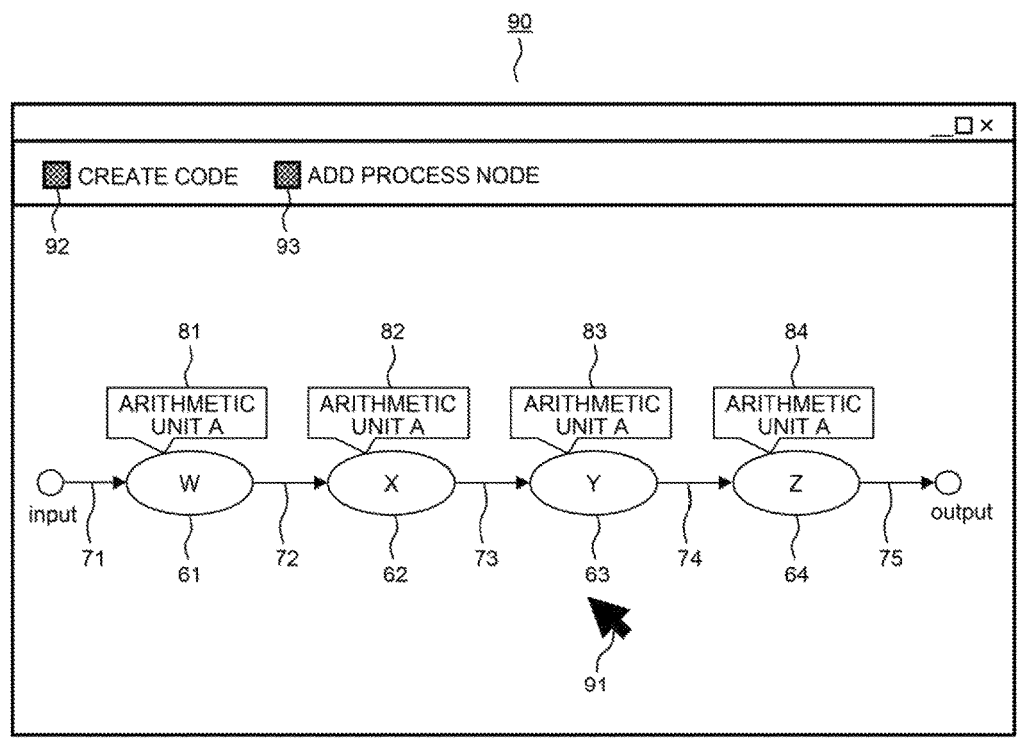
FIG. 8 is an explanatory diagram showing an example of a graph information input/edit screen area.

FIG. 8 shows an example of a graph information input/edit screen area 90. In the graph information input/edit screen area 90, already input graph information is displayed on the display device 7; the selection and edit can be performed by a cursor 91 of the mouse 8 serving as an input device. The nodes 61-64 on the graph represent processes included in the data processing of the user application respectively, and connection lines 71-75 represent flows of data. Further, on the screen area, there are Create-code button 92 and Add process-node button 93. As described below, the GUI part 1 works in response to an input from the input device 8 such as a mouse; the mouse cursor 91 is used on the screen area to create an application software program in a graph form. The graph information is stored in the graph information-holding part 2; the GUI part 1 updates the graph information. When clicking on the Create-code button 92, the program-creating part 3 creates a corresponding program 4 from graph information held by the graph information-holding part 2. A new process node can be added by clicking on the Add process-node button 93. That is, the graph information input by the GUI part 1 is held by the graph information-holding part 2, and the program-creating part 3 creates a program 4 corresponding thereto. After that, in case that the graph information held in the graph information-holding part 2 is updated as a result of edit by the GUI part 1, the program-creating part 3 re-creates a program 4 corresponding to graph information thus updated according to the update.

In such graph information, the executing processing unit information 81-84 is added to the nodes 61-64; in an initial status (default status), the processing unit A(20) is allocated to each node. In FIG. 8, the executing processing unit information 81-84 is represented in word balloons displayed over the process nodes 61-64. The display form shown in the diagram is just an example, and another display formed may be adopted.

Figure 9:
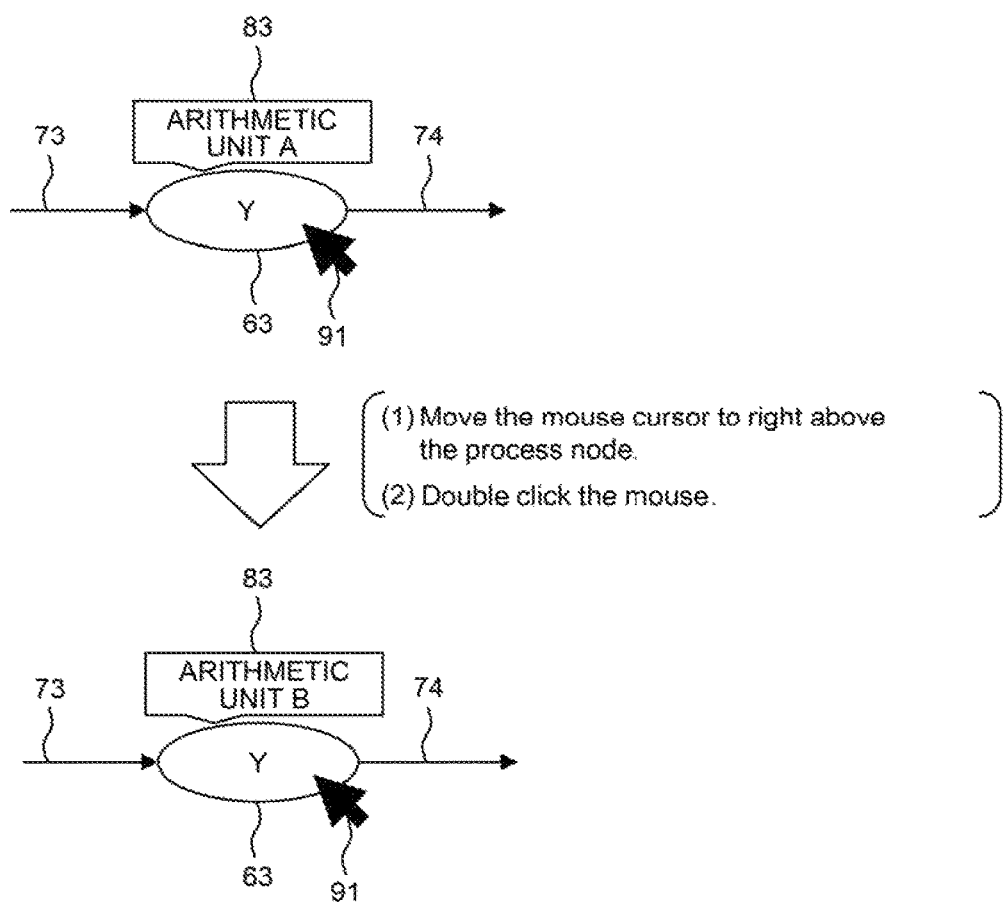
FIG. 9 is an explanatory diagram showing a method arranged to use a double click, which is an example of an operation for switching the processing unit in charge of process execution.

FIGS. 9 and 10 are each an explanatory diagram showing an example of an operation for switching the processing unit in charge of execution in connection with one process node. FIG. 9 shows a method arranged to use a double click, whereas FIG. 10 shows a method arranged to use a context menu. FIG. 11 is a flow chart of the method arranged to use a double click. In the example, the processing unit in charge of the node 63 for executing a process Y is switched from the processing unit A(20) to the processing unit B(30).

In the method arranged to use a double click, the processing unit in charge of the execution can be switched by moving the mouse cursor 91 to right above the process node 63 for which the switching of the processing unit allocated thereto is desired, and then double-clicking the mouse. The GUI part 1 executes steps of the flow chart shown in FIG. 11. First, the determination is made on whether or not the process node is double clicked (Step 1). In the event of the process node 63 determined to be double clicked, the name of the process of the node 63 and that of the processing unit currently allocated thereto are acquired (Step 2). Then, a list of candidates for the process function corresponding to the name of the process is acquired from the process-executing function database 5 (Step 3). In case that the number of the candidates for the process function is more than one, the processing unit in charge of the node is changed to the processing unit subsequent to the currently allocated processing unit (Step 4). In case that the number of the candidates is only one, the processing unit allocated to the node remains unchanged (Step 4).

In this way, a high level of operationality is maintained even in such a case that the number of processing units capable of executing a process is three or more.

FIG. 12 is an explanatory diagram showing examples of the process-executing functions stored in the process-executing function database 5. In the process-executing function database 5, function names when the processing units A(20) and B(30) execute each process are stored for each process name. The symbol "-" (hyphen) in the diagram indicates that the function corresponding to the process name is not implemented as to the processing unit of interest. The process-executing function for executing the process W of the process node 61 by the processing unit A(20) is funcW(in1,out1), whereas the process-executing function for executing the process W by the processing unit B(30) is not implemented. When executing the process X of the process node 62 by the processing unit A(20), the process-executing function funcX(in1,out1) is used, whereas when executing the process by the processing unit B(30), the process-executing function start_B_funcX(in1, out1) is used. Likewise, when executing the process Y of the process node 63 by the processing unit A(20), the process-executing function funcY (in1,out1) is used, whereas when executing the process by the processing unit B(30), the process-executing function start_B_funcY(in1,out1) is used. The process-executing function for executing the process Z of the process node 64 by the processing unit A(20) is funcZ(in1,out1), whereas the process-executing function for executing the process Z by the processing unit B(30) is not implemented.

Instead of the above method arranged to switch the processing unit by means of double click, the method for switching the processing unit may be arranged to perform the switching by means of single click, or pressing a given key (e.g. "c" key) of a keyboard.

Otherwise, the switching may be performed by a context menu 94 which is displayed by clicking the right button of the mouse as shown in FIG. 10. In the method by use of a context menu shown in FIG. 10, the processing unit in charge of the execution can be switched by moving the mouse cursor 91 to right above the process node 63 for which the switching of the processing unit allocated thereto is desired, and then clicking the right button of the mouse. In the context menu 94, options of "Switch the processing unit" and "Delete the process node" are shown, which are selected by a user operation. Selecting "Switch the processing unit", the processing unit in charge of the node 63 is switched to the processing unit B(30). At this time, the GUI part 1 executes steps of the same flowchart as those shown by FIG. 11. In case that there are two or more candidates for the process function in Step 4, the method may be arranged so that the candidates for the process function, or processing unit names are displayed in the context menu 94 to make possible to select them.

Thus, it becomes possible to readily switch the processing unit in charge of process execution for each node. Therefore, the design productivity can be increased. A user is allowed to switch the processing unit to be made to execute the process by just performing a simple operation on GUI. The rewrite of the program 4 necessary for the switching is automatically performed in the program development support system 10 while it remains invisible for a user.

A method for creating a program from graph information in which the processing unit in charge of process execution is set for each process node will be described further in detail below.

FIG. 13 shows an example of a user application described in a graph form, and FIG. 14 shows an example of a program created from the user application. The user application is arranged so that four processes W, X, Y and Z are executed in turn. In addition, the processes W, X and Z are executed by the processing unit A(20) and the process Y is executed by the processing unit B(30). In the diagram, da1-da5, db3 and db4 displayed under the connection lines are parameter names used in the example of the program of FIG. 14.

Figure 15:
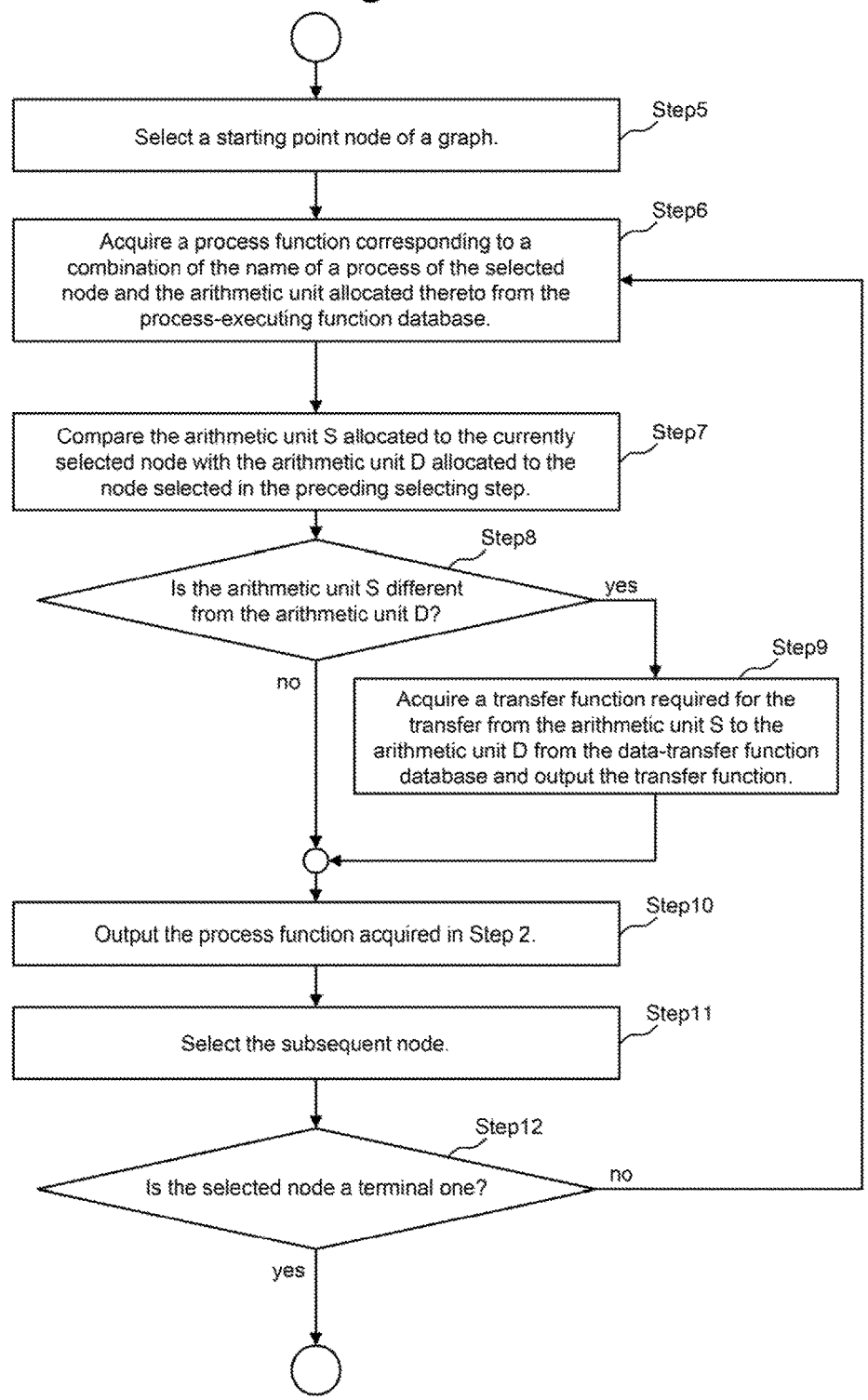
FIG. 15 is a flow chart showing the action of a program-creating part.

FIG. 15 is a flow chart showing the action of the program-creating part 3. It selects a starting point node of a graph (Step 5). Subsequently, the program-creating part acquires a process function corresponding to a combination of the name of a process of the selected node and the processing unit allocated thereto from the process-executing function database 5 (Step 6). Next, the program-creating part compares the processing unit S allocated to the currently selected node with the processing unit D allocated to the node selected in the preceding selecting step (Step 7). Then, if the processing unit S is different from the processing unit D (Step 8), the program-creating part acquires a transfer function required for the transfer from the processing unit S to the processing unit D from the data-transfer function database 6 and outputs it to the program 4 (Step 9). Subsequently, it outputs the process function acquired in Step 6 to the program 4. Then, the program-creating part selects the subsequent node in the graph (Step 11). If the selected node is not a terminal node (Step 12), the program-creating part goes back to Step 6, whereas with no subsequent node, the program-creating part terminates the processing. Incidentally, in case that the processing unit which is allocated to the least selected node is not the processing unit A(20), the program-creating part outputs the transfer function to the processing unit A(20) and then terminates its processing.

FIG. 16 is an explanatory diagram showing data-transfer functions used in the program of FIG. 14. In the data-transfer function database 6, a data-transfer function is stored corresponding to each combination of input-side and output-side processing units. As shown in FIG. 16, a data-transfer function copy_to_B(src, dst, size) for performing data transfer from the processing unit A(20) to the processing unit B(30), and a data-transfer function copy_from_B(src, dst, size) for performing reverse data transfer from the processing unit B(30) to the processing unit A(20) are prepared in the data-transfer function database 6.

In the lines #1 to #7 in FIG. 14, a process for ensuring a necessary memory region is described, in which the function alloc_A( ) is used to ensure a memory region of the processing unit A(20). The transfer of data between the processing unit A(20) and the processing unit B(30) before and after the process Y becomes necessary for the process Y performed by the processing unit B(30). On this account, an input/output memory region of the processing unit B(30) is separately ensured by the function alloc_B( ) (in the lines #5 and #6).

After calling the function load_input( ) for reading input data (line #9), the functions funcW( ) and funcX( ) for executing the processes W and X by the processing unit A(20) are called in the lines #11 and #13, respectively.

After that, data are copied from the processing unit A(20) to the processing unit B(30) because the processing unit B(30) performs the process Y. Specifically, in the line #15, the function copy_to_B( ) is used to copy data da3 on the processing unit A(20), which is an output of the process X, into data db3 of the processing unit B(30), which makes an input to the process Y.

After that, in the line #16, the function start_B_funcY( ) for executing the process Y by the processing unit B(30) is called.

Then, in the line #17, the function copy_from_B( ) is used to copy data db4 on the data memory 33 of the processing unit B(30), which is an output of the process Y, into data da4 on the data memory 23 of the processing unit A(20), which makes an input to the process Z.

Subsequently, in the line #19, the function funcZ( ) for executing the process Z by the processing unit A(20) is called.

As described above, the program is arranged so that basically all the processes are executed by the processing unit A(20), in which a change is made so that the processing unit B(30) executes part of the processes, and function calls for data transfer are inserted before and after the change.

FIG. 17 is an explanatory diagram showing various functions used in the program of FIG. 14.

In the region-ensuring function alloc_B( ) of the data memory 33 of the processing unit B(30) in the lines #1 to #7, a region size to be ensured is set in b_arg1 in a setting register 31, FUNC_B_ALLOC representing a pointer to the region-ensuring function in the program memory 32 is set in b_func, and "1" is written in the b_start register, whereby the processing unit B(30) is activated. After that, the program execution is put on standby until b_finish becomes "1" and then, a return value b_return from the processing unit B(30) is returned as a return value of the function alloc_B( ) after the completion of processing by the processing unit B(30).

In the function start_B_funcY( ) of the process Y executed by the processing unit B(30) in the lines #9 to #15, two arguments in1 and out1 are set in b_arg1 and b_arg2 in the setting register 31, FUNC_B_Y representing a pointer to the function Y in the program memory 32 is set in b_func, and "1" is written in the b_start register, whereby the processing unit B(30) is activated. After that, the target device waits for b_finish to turn to "1" and then, terminates the processing of the function. Here, the addresses represented by in1 and out1 are addresses in the data memory 33 of the processing unit B(30), and the processing unit B(30) processes input data transferred to the address represented by in1 in the data memory 33. In addition, the result of the process Y is stored in an output data region at the address represented by out1 in the data memory 33.

In the function copy_to_B( ) in the lines #17 to #23, the data-transfer device 40 is used to transfer data from the data memory 23 of the processing unit A(20) to the data memory 33 of the processing unit B(30). In the function, addr_a of a transfer source is set in dma_addr_a of the setting register 41 in the data-transfer device 40, and addr_b of a transfer destination is set in dma_addr_b, and the transfer direction is set in dma_direction, subsequently, "1" is written in the dma_start register and then, the data transfer is started. After that, the target device waits for dma_finish to turn to "1" and then, terminates the processing of the function.

In the function copy_from_B( ) in the lines #24 to #30, the data-transfer device 40 is used to transfer data from the data memory 33 of the processing unit B(30) to the data memory of the processing unit A(20). In processing according to the function, addr_b of a transfer source is set in dma_addr_b of the setting register 41 in the data-transfer device 40, addr_a of a transfer destination is set in dma_addr_a, the transfer direction is set in dma_direction and then, "1" is written in dma_start register, whereby the data transfer is started. After that, the target device waits for dma_finish to turn to "1" and then, terminates the processing of the function.

The various functions to be prepared in the process function database 5 and the data-transfer function database, including the functions shown in FIG. 17, may be previously developed and prepared in parallel with the development of the target device 50.

As described above, according to the embodiment, the processing unit in charge of process execution can be switched readily. Further, since a required data transfer process is automatically created according to the allocation of the processing units, the design productivity can be increased significantly. While in the description on the embodiment, a target device including only the processing unit A(20) and the processing unit B(30) is taken as an example, the embodiment can be expanded to a target device including three or more processing units and applied thereto likewise.

In such a case that the processing unit A(20) is a general-purpose processor such as CPU and the processing unit B(30) is an accelerator, usually all of processes constituting data processing of a user application can be executed by the processing unit A(20) which is CPU and part of the processes can be also executed by the processing unit B(30) which is an accelerator. In this case, the process-executing function database 5 stores process-executing functions concerning all the processes, which are arranged for executing the processes by the processing unit A(20), and process-executing functions in connection with part of the processes, which are arranged for making the processing unit B(30) execute the part of the processes. The GUI part 1 may allocate CPU serving to the processing unit A(20) to all the nodes 61-64 in the graph information as the initial status (default status) of executing processing unit information 81-84. The embodiment provides a user interface which can change the allocation of the processing unit to each node according to the above method after that.

According to the arrangement like this, a default status (initial status) is set so that all of processes included in data processing of a user application are executed by CPU; part of the processes, which can be also executed by an accelerator, can be switched through GUI readily, and therefore the design productivity can be increased.

[Second Embodiment]

While only simple copy functions have been described as data-transfer functions in the first embodiment, data-transfer functions required according to the allocation of processing units may include a function for converting a data format.

[Endian Conversion]

An embodiment in which data-transfer functions include functions for conversion between a big endian and a little endian will be described.

FIG. 14 shows a program 4 created based on graph information as shown in FIG. 13; the graph information is created by switching the processing unit A in charge of executing the process Y of the node 63 in the data processing shown in FIG. 8 to the processing unit B. In this embodiment, the processing unit A(20) is CPU involving many instructions premised on the prerequisite that data is a little endian, and the processing unit B(30) is an accelerator which data of a big endian is input to and output from, for example. In that case, the faculty of data conversion of a little endian to a big endian is added to the data-transfer function copy_to_B to the processing unit B in the program 4 shown in FIG. 14; and the faculty of data conversion of a big endian to a little endian is added to the data-transfer function copy_from_B from the processing unit B.

The method for implementation of the faculty of endian conversion may be elective one. For instance, the faculty of endian conversion may be implemented in a form of software on condition that the processing unit A(20) is CPU. Further, on condition that the processing unit B(30) is an accelerator, the faculty of endian conversion may be implemented in a form of hardware accompanying it.

FIG. 18 is an explanatory diagram showing an example of a program in which data-transfer functions each having the faculty of data conversion added thereto are used. The program is different from that of FIG. 14 in that the faculty of data conversion of a little endian to a big endian is added as LittleEndianToBigEndian function in the line #17, and the faculty of data conversion of a big endian to a little endian is added as BigEndianToLittleEndian function in the line #21. As shown by example in FIG. 18, these functions may be defined as functions different from the copy function copy_to_B nor copy_from_B, or may be each defined as an internal faculty of the copy function copy_to_B or copy_from_B. In case that there are a large number of combinations of conversions because of a large number of processing units, the following are made possible by defining the data conversion by another function to be executed by a particular general-purpose processing unit such as CPU: to widen the degree of freedom of selection; and to suppress the increase in the size of the data-transfer function database. On the other hand, in case that data conversion is executed by a piece of hardware implemented on the accelerator side, the faculty of data conversion may be implemented as a faculty built in the copy function copy_to_B or copy_from_B, or the process-executing function start_B_funcY.

The embodiment can be expanded to a target device including three or more processing units likewise. The faculty of endian conversion is added to a data-transfer function to a processing unit in such a case that the endian of the input data to the processing unit of interest is different from the endian of output data of the processing unit in charge of preceding process execution.

[Fixed Point/Floating Point, and Single Precision/Double Precision]

The above description is applicable to such a case that the data format is changed between the processing units in charge of process execution before and after transfer by the data-transfer function in the light of whether a fixed point or floating point, or bit precision such as a single precision or double precision instead of endian likewise. Data format conversion from a fixed point format to floating point one, and reverse data format conversion thereof, or data format conversion from a single precision format to double precision one and reverse data format conversion thereof may be appropriately added to data-transfer functions. Now, it is noted that the single precision and the double precision are not limited to a numeral value represented by one byte and a numeral value represented by two bytes, which can be expanded to data represented by three bytes likewise. Further, they are not limited to data in units of bytes, and they may be changed to data of an appropriate bit length.

[Data Array Conversion]

Figure 19:
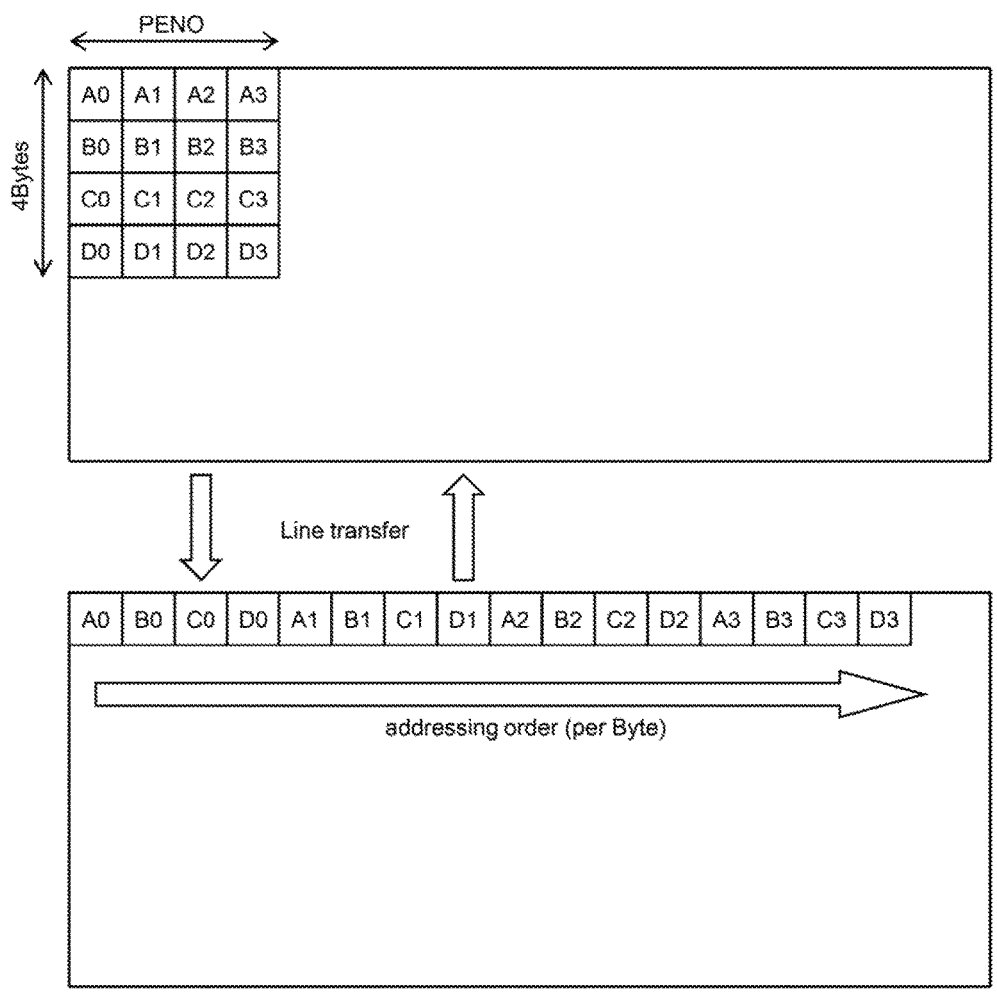
FIG. 19 is an explanatory diagram for schematically explaining an example of the faculty of data array conversion accompanying the data-transfer function.

FIG. 19 is an explanatory diagram for schematically explaining an example of the faculty of data array conversion accompanying a data-transfer function. Data format conversions accompanying data-transfer functions required according to the allocation of the processing units may include a data array conversion adequate to each processing unit. For instance, in such a case that one processing unit A(20) is CPU which is a kind of a general-purpose processor, and the processing unit B(30) is an accelerator which adopts a parallel processor architecture of SIMD (Single Instruction Multiple Data) type, data array conversion is performed. It is proper for input/output data of the processing unit A(20) to take a data array form premised on that the data are sequentially accessed by addresses as shown in a lower side portion of FIG. 19. On the other hand, in the case of a parallel processor of SIMD type, it is suitable that the input/output data take a data array appropriate for processor elements PE (Processor Element) working in parallel to access data in parallel as shown by an upper side portion of FIG. 19. Therefore, in executing a process by the processing unit B(30) just after the processing by the processing unit A(20), data array conversion is performed in a direction from the lower portion toward the upper portion in FIG. 19; a result of the processing by the processing unit B(30) is subjected to data array conversion in the direction from the upper portion toward the lower portion of FIG. 19 and then, returned to the process by the processing unit A(20).

The data array conversion like this may be performed in combination with the data format conversion of endians as described above.

Appropriately adding the faculty of data format conversion or data array conversion to data-transfer functions as described above, it is possible to readily cope with the switching of the processing unit in charge of process execution even with the processing units different in data format. That is, data format or data array conversion is programmed in combination with the switching of the processing unit in charge of process execution even in the case of different kinds of processing units differing from each other in data format or data array, which makes possible to readily switch the processing unit in charge of process execution for each node and therefore, to increase the design productivity.

While the invention made by the inventor has been concretely described based on the embodiments, the invention is not limited to the embodiments. It is obvious that various changes or modifications may be made without departing from the subject matter thereof.

For instance, in case that a target device can execute the same process in forms different from each other, the different forms can be handled as different processing units. Therefore, the target device may be arranged not to include processing units physically and definitely separated from each other.

What is claimed is:

1. A program development support system which creates a program performing data processing by working on a target device having a plurality of processing units comprises:
   a display device;
   an input device; and
   a computer having a graphical user interface part, a graph information-holding part, a program-creating part, a process-executing function database, and a data-transfer function database, which are implemented as faculties of the computer,
   wherein the graphical user interface part displays graph information of the data processing executed by the target device on the display device as a graph, provided that in the graph, a plurality of processes included in the data processing make nodes respectively and flows of data form directed connection lines,
   the graph information-holding part holds the graph information;
   the process-executing function database holds process-executing functions for executing the processes by appropriate ones of the plurality of processing units, capable of executing the processes, the data-transfer function database holds data-transfer functions for executing the process-executing functions by the corresponding processing units, the program-creating part reads an appropriate process-executing function from the process-executing function database based on the graph information, reads an appropriate data-transfer function from the data-transfer function database, and creates the program, of the processes, a first process can be executed by any of first and second processing units of the plurality of processing units, provided that the first and second processing units are different from each other in kind, the process-executing function database holds a first process-executing function for executing the first process by the first processing unit, and a second process-executing function for executing the first process by the second processing unit, the data-transfer function database holds at least one of a first data-transfer function for executing the first process-executing function with the first processing unit, and a second data-transfer function for executing the second process-executing function with the second processing unit, on condition that the data processing includes the first process, the graphical user interface part can display the fact that the first or second processing unit can execute the first process at a node corresponding to the first process on the display device, and makes possible to select, by the input device, which of the first and second processing units to use for executing the first process, and the program-creating part selectively reads the first or second process-executing function from the process-executing function database, corresponding to the processing unit selected by the input device, selectively reads the first or second data-transfer function from the data-transfer function database, and creates the program.

2. The program development support system according to claim 1, wherein the first process can be executed by a third processing unit of the plurality of processing units, provided that the third processing unit is different from the first and second processing units in kind, the process-executing function database further holds a third process-executing function for executing the first process by the third processing unit, the data-transfer function database holds a third data-transfer function for executing the third process-executing function by the third processing unit, on condition that the data processing includes the first process, the graphical user interface part can display the fact that the first, second or third processing unit can execute the first process at a node corresponding to the first process on the display device, and makes possible to select, by the input device, which of the first, second and third processing units to use for executing the first process, and the program-creating part selectively reads the first, second or third process-executing function from the process-executing function database, corresponding to the processing unit selected by the input device, selectively reads the first, second or third data-transfer function from the data-transfer function database, and creates the program.

3. The program development support system according to claim 1, wherein the first processing unit is a general-purpose processor, and the second processing unit is an accelerator, all of the plurality of processes included in the data processing can be executed by the first processing unit, and part of which can be also executed by the second processing unit, the process-executing function database holds a first process-executing function group for executing, by the first processing unit, each process of all of the processes, and a second process-executing function group for executing the part of the plurality of processes by the second processing unit, the data-transfer function database holds, for each process-executing function included in the second process-executing function group, an input data-transfer function for transferring input data of the process-executing function from the first processing unit to the second processing unit for the purpose of executing the process-executing function with the second processing unit, and an output data-transfer function for transferring a result of execution of the process-executing function by the second processing unit to the first processing unit, the graphical user interface part displays all of the processes included in the data processing as being executed by the first processing unit in an initial stage, the program-creating part reads the first process-executing function group from the process-executing function database to produce the program with priority in the initial stage, the graphical user interface part can display the first or second processing unit as being capable of executing the processes at nodes corresponding to the part of the plurality of processes on the display device, and makes possible to select, by the input device, which of the first and second processing units to use for executing each process, and on condition that the processing unit selected by the input device in connection with a node is the second processing unit, the program-creating part reads a corresponding process-executing function in the second process-executing function group from the process-executing function database, and reads a corresponding input data-transfer function and a corresponding output data-transfer function from the data-transfer function database to update the program.

4. The program development support system according to claim 3, wherein the input device is a mouse, and on condition that a node selected by a cursor of the mouse is the node corresponding to the part of the plurality of processes, the graphical user interface part displays the first or second processing unit as being capable of executing the process in the form of a context menu on the display device, and makes possible to select, by the mouse cursor, which of the first and second processing units to use for executing the process.

5. The program development support system according to claim 3, wherein the input device is a mouse, the graphical user interface part switches the processing unit in charge of executing the process corresponding to the node from the first processing unit to the second processing unit on condition that the node selected by the mouse is the node corresponding to the part of the plurality of processes, and the graphical user interface part switches the processing unit in charge of executing the process corresponding to the node from the second processing unit to the first processing unit on condition that the node is selected again.

6. The program development support system according to claim 5, wherein the node is selected by a double click on the mouse.

7. The program development support system according to claim 5, wherein part of processes further included in the part of the plurality of processes can be also executed by another processing unit, and
on condition that the node selected by the mouse is a node corresponding to the part of processes further included in the part of the plurality of processes, the graphical user interface part sequentially switches the processing unit in charge of executing a process corresponding to the node among the first processing unit, the second processing unit and the other processing unit according to a predetermined order.

8. The program development support system according to claim 1, wherein on condition that the format of input data of the first process-executing function is different from a format of output data of a process-executing function executed by a processing unit different from the first processing unit and just prior to the first process-executing function, the first data-transfer function has the faculties of transferring the input data from the different processing unit, and of converting the output data format into the input data format, and
on condition that a format of input data of the second process-executing function is different from a format of output data of a process-executing function executed by a processing unit different from the second processing unit and just prior to the second process-executing function, the second data-transfer function has the faculties of transferring the input data from the different processing unit and of converting the output data format into the input data format.

9. The program development support system according to claim 8, wherein the formats are defined by a combination of big and little endians, a combination of fixed and floating points, or bit precision.

10. The program development support system according to claim 1, wherein on condition that a data array of input data of the first process-executing function is different from a data array of output data of a process-executing function executed by a processing unit different from the first processing unit and just prior to the first process-executing function, the first data-transfer function has the faculties of transferring the input data from the different processing unit and of converting the data array of the output data into the data array of the input data, and
on condition that a data array of input data of the second process-executing function is different from a data array of output data of a process-executing function executed by a processing unit different from the second processing unit and just prior to the second process-executing function, the second data-transfer function has the faculties of transferring the input data from the different processing unit and of converting the data array of the output data into the data array of the input data.

11. A non-transitory computer readable medium containing program instructions for creating a program for performing data processing by a target device having a plurality of processing units, wherein execution of the program instructions by a computer which includes:
a graphical user interface part;
a graph information-holding part;
a program-creating part;
a process-executing function database; and
a data-transfer function database, and
which has a display device and an input device connected thereto,
cause:
displaying, by the graphical user interface part, graph information of the data processing executed by the target device on the display device as a graph, provided that in the graph, a plurality of processes included in the data processing make nodes respectively and flows of data form directed connection lines,
holding, by the graph information-holding part, the graph information,
holding, by the process-executing function database, process-executing functions for executing the processes by appropriate ones of the plurality of processing units, capable of executing the processes,
holding, by the data-transfer function database, data-transfer functions functions for executing the process-executing functions by the corresponding processing units,
reading, by the program-creating part, an appropriate process-executing function from the process-executing function database based on the graph information, reading an appropriate data-transfer function from the data-transfer function database, and creating the program,
of the processes, executing a first process by any of first and second processing units of the plurality of processing units, provided that the first and second processing units are different from each other in kind,
holding, by the process-executing function database, a first process-executing function for executing the first process by the first processing unit, and a second process-executing function for executing the first process by the second processing unit,
holding, by the data-transfer function database, at least one of a first data-transfer function for executing the first process-executing function with the first processing unit, and a second data-transfer function for executing the second process-executing function with the second processing unit,
on condition that the data processing includes the first process, displaying, by the graphical user interface part, the fact that the first or second processing unit can execute the first process at a node corresponding to the first process on the display device, and making possible to select, by the input device, which of the first and second processing units to use for executing the first process, and
selectively reading, by the program-creating part, the first or second process-executing function from the process-executing function database, corresponding to the processing unit selected by the input device, selectively reading the first or second data-transfer function from the data-transfer function database, and creating the program.

12. The non-transitory computer readable medium according to claim 11, wherein the first process can be executed by a third processing unit of the plurality of processing units, provided that the third processing unit is different from the first and second processing units in kind, the process-executing function database further holds a third process-executing function for executing the first process by the third processing unit, the data-transfer function database holds a third data-transfer function for executing the third process-executing function by the third processing unit, on condition that the data processing includes the first process, the graphical user interface part can display the fact that the first, second or third processing unit can execute the first process at a node corresponding to the first process on the display device, and makes possible to select, by the input device, which of the first, second and third processing units to use for executing the first process, and the program-creating part selectively reads the first, second or third process-executing function from the process-executing function database, corresponding to the processing unit selected by the input device, selectively reads the first, second or third data-transfer function from the data-transfer function database, and creates the program.

13. The non-transitory computer readable medium according to claim 11, wherein the first processing unit is a general-purpose processor, and the second processing unit is an accelerator, all of the plurality of processes included in the data processing can be executed by the first processing unit, and part of which can be also executed by the second processing unit, the process-executing function database holds a first process-executing function group for executing, by the first processing unit, each process of all of the processes, and a second process-executing function group for executing the part of the plurality of processes by the second processing unit, the data-transfer function database holds, for each process-executing function included in the second process-executing function group, an input data-transfer function for transferring input data of the process-executing function from the first processing unit to the second processing unit for the purpose of executing the process-executing function with the second processing unit, and an output data-transfer function for transferring a result of execution of the process-executing function by the second processing unit to the first processing unit, the graphical user interface part displays all of the processes included in the data processing as being executed by the first processing unit in an initial stage, the program-creating part reads the first process-executing function group from the process-executing function database to produce the program with priority in the initial stage, the graphical user interface part can display the first or second processing unit as being capable of executing the processes at nodes corresponding to the part of the plurality of processes on the display device, and makes possible to select, by the input device, which of the first and second processing units to use for executing each process, and on condition that the processing unit selected by the input device in connection with a node is the second processing unit, the program-creating part reads a corresponding process-executing function in the second process-executing function group from the process-executing function database, and reads a corresponding input data-transfer function and a corresponding output data-transfer function from the data-transfer function database to update the program.

14. The non-transitory computer readable medium according to claim 13, wherein the input device is a mouse, and on condition that a node selected by a cursor of the mouse is the node corresponding to the part of the plurality of processes, the graphical user interface part displays the first or second processing unit as being capable of executing the process in the form of a context menu on the display device, and makes possible to select, by the mouse cursor, which of the first and second processing units to use for executing the process.

15. The non-transitory computer readable medium according to claim 13, wherein the input device is a mouse, the graphical user interface part switches the processing unit in charge of executing the process corresponding to the node from the first processing unit to the second processing unit on condition that the node selected by the mouse is the node corresponding to the part of the plurality of processes, and the graphical user interface part switches the processing unit in charge of executing the process corresponding to the node from the second processing unit to the first processing unit on condition that the node is selected again.

16. The non-transitory computer readable medium according to claim 15, wherein the node is selected by a double click on the mouse.

17. The non-transitory computer readable medium according to claim 15, wherein part of processes further included in the part of the plurality of processes can be also executed by another processing unit, and on condition that the node selected by the mouse is a node corresponding to the part of processes further included in the part of the plurality of processes, the graphical user interface part sequentially switches the processing unit in charge of executing a process corresponding to the node among the first processing unit, the second processing unit and the other processing unit according to a predetermined order.

18. The non-transitory computer readable medium according to claim 11, wherein on condition that the format of input data of the first process-executing function is different from a format of output data of a process-executing function executed by a processing unit different from the first processing unit and just prior to the first process-executing function, the first data-transfer function has the faculties of transferring the input data from the different processing unit, and of converting the output data format into the input data format, and on condition that a format of input data of the second process-executing function is different from a format of output data of a process-executing function executed by a processing unit different from the second processing unit and just prior to the second process-executing function, the second data-transfer function has the faculties of transferring the input data from the different processing unit and of converting the output data format into the input data format.

19. The non-transitory computer readable medium according to claim 18, wherein the formats are defined by a combination of big and little endians, a combination of fixed and floating points, or bit precision.

20. The non-transitory computer readable medium according to claim 11,
- wherein on condition that a data array of input data of the first process-executing function is different from a data array of output data of a process-executing function executed by a processing unit different from the first processing unit and just prior to the first process-executing function, the first data-transfer function has the faculties of transferring the input data from the different processing unit and of converting the data array of the output data into the data array of the input data, and
- on condition that a data array of input data of the second process-executing function is different from a data array of output data of a process-executing function executed by a processing unit different from the second processing unit and just prior to the second process-executing function, the second data-transfer function has the faculties of transferring the input data from the different processing unit and of converting the data array of the output data into the data array of the input data.

\* \* \* \* \*